Patented June 14, 1927.

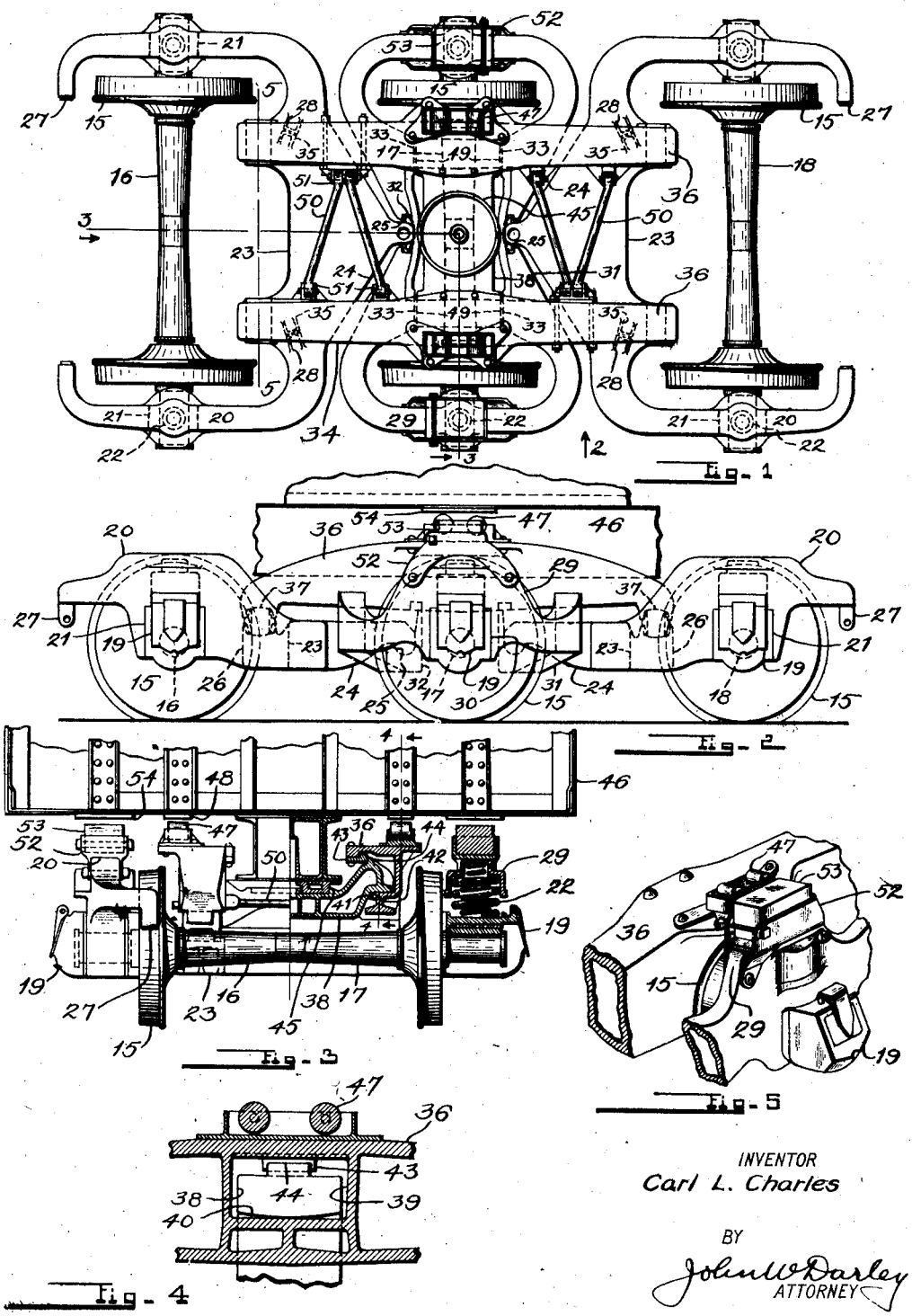

1,632,117

UNITED STATES PATENT OFFICE.

CARL L. CHARLES, OF BALTIMORE, MARYLAND, ASSIGNOR, BY MESNE ASSIGNMENTS, TO HERBERT M. BRUNE, CHARLES E. SCARLETT, AND JANON FISHER, TRUSTEES, ALL OF BALTIMORE, MARYLAND.

RAILWAY-CAR TRUCK.

Application filed January 31, 1925. Serial No. 6,070.

My invention relates to railway car trucks.

The object of my invention is to produce a truck having side bearings, additional to those of the usual type, which are so positioned relative thereto as to damp the oscillation of the car body, thereby preventing excessive overloading of the journals on one side of the truck and reducing the hazards of operation.

One example of my improved truck is shown in the accompanying drawing for purposes of illustration, the truck, exclusive of the additional side bearings, being the same as that illustrated and described in U. S. Letters Patent, No. 1,568,058, dated Jan. 5, 1926. The side bearings, which form the new element relative to said patent, are compensating in their nature and function to retard the oscillation of the car body, thereby tending to maintain said body more nearly in its normal position. Therefore, while possessing great advantages when utilized in connection with any type of body, they are particularly useful for those having a high center of gravity, such as box, hopper, passenger cars and the like.

It is highly desirable in railway car trucks to equalize the journal loads in order to achieve a smooth operation and to reduce overloading, with its resulting decrease in the longevity of the truck. Trucks as now constructed, however, do not satisfactorily control the oscillation of the car body, which is the principal cause of such overloading, and hence the forces set up thereby result in a heavy pressure on the journals on one side of the truck. In order to solve this problem, I have devised the truck illustrated and described in this application, but while said truck and its additional side bearings possess certain advantages by reason of its construction, noted hereinafter, I do not desire to be limited to the particular combination shown, for the gist of my invention lies in the production of a truck whether four or six wheels, flexible or rigid, having bearings additional to the usual kind and adapted to function in the manner described above and hereinafter.

My improved truck comprises six wheels mounted upon three axles and each axle is revolubly mounted in a member. The pilot and trailer members are connected to the central member by what is substantially a ball and socket joint so that each member may move vertically and transversely horizontally without producing a corresponding movement of either or both of the other members.

Means are also provided for producing a horizontal co-ordinating action of the wheels and journals so that the wheels will conform to the contour of the rails whatever it may be, and so that the angular position of the central axle will be coordinated to the position of either or both the pilot and trailer axles.

The horizontal coordinating action involved in my improved truck is clearly illustrated and explained and the method and means by which said action is effectuated is set forth in U. S. Patent No. 1,341,776, issued June 1st, 1920.

In combination with the horizontal coordinating action just referred to, my improved truck involves equalized vertical actions of the several members of the truck and the method of accomplishing the horizontal coordinating action of truck members in combination with an equalized vertical action thereof is set forth in U. S. Letters Patent No. 1,341,777, issued June 1st, 1920. In the last-named Letters Patent there is also set forth one means for effecting the horizontal coordinating action of the several members in combination with an equalized vertical action thereof. A further means of effecting the horizontal coordinating action of the several members in combination with an equalized vertical action thereof is illustrated and described in Patent No. 1,568,058 above noted.

In the drawings:—

Figure 1 is a plan view of a six wheel truck constructed according to my invention, the car body being omitted for the sake of clearness.

Figure 2 is a view looking in the direction of the arrow 2 in Figure 1.

Figure 3 is a sectional elevation of a portion of my truck along the line 3—3 in Figure 1, looking in the direction of the arrows.

Figure 4 is a partial section along the line 4—4 in Figure 3, looking in the direction of the arrows.

Figure 5 is a perspective view of a portion of my truck showing the relation between the side bearings on one side thereof.

In the drawings:—

15 represents the wheels and 16, 17 and 18 represent, respectively, the pilot, central and trailer axles. The journals of the axles are mounted in any approved form of axle box such as 19 and the wheels and axles are of American Railway Association standards.

Each pilot and trailer bolster consists of a pair of pedestals such as 20, each pedestal being provided with a recess having jaws 21 for the reception of the axle box 19 which slides freely therein and springs 22 are placed between each axle box and the top of the corresponding recess. The pedestals 20—20 of each end member are joined together by a frame 23 and said frame is provided with an extension 24 terminating in the boss 25 having a hemispherical lower surface.

The frame 23 is provided with two bases 26—26 for a purpose hereinafter explained and with ears 27—27 for the support of brake parts. The brake parts forming no part of my present invention are not illustrated or described. Each frame 23 is further provided with a pair of rocker bearings 28—28.

The central bolster consists of a pair of pedestals such as 29—29, each pedestal being provided with a recess having jaws 30 for the reception of the axle box 19 which has free vertical movement therein, and springs 22 are placed between each axle box and the top of the corresponding recess. The pedestals 29—29 of the central bolster are joined together by the frame 31 and said frame may be provided with ears for the support of brake parts.

The frame 31 is provided on each side with a socket 32 having a hemispherical bottom. One of the bosses 25 is introduced in each of the sockets 32 and serves to connect the corresponding pilot and trailer bolsters with the central bolster. The frame 31 is further provided with four true surfaces 33.

The coordinating bolster 34 is provided with four bearings 35 which contact with the rocker bearings 28. The bearings 35 are formed upon the longitudinal beams 36—36 of the coordinating bolster 34, said beams also extending over the friction reducing elements 37, one of said elements being mounted between each end of the beams 36—36 and the corresponding base 26.

In addition to the longitudinal beams 36—36 above noted, the coordinating bolster 34 comprises a central member 38, the ends of which are inserted within openings 39 provided in said beams and bear upon the latter. In order to permit of vertical rocking action of the beams 36 with respect to the central member 38, the bearing surfaces on the ends of said member are curved as shown at 40 in Fig. 4. The openings 39 have sufficient length that the member 38 may be easily engaged with the beams 36 and so as to allow of the rocking movement above referred to, but not enough to permit undue horizontal displacement of said member relative to said beam. Transverse movement of the member 38 relative to the beams 36 is prevented by a vertical bearing surface 41 provided on each end of the member 38 which coacts with a similar bearing surface 42 on each beam 36. A stop plate 43 is secured to the underside of the beam 36 and said plate is adapted to coact with a nose 44 formed on the member 38, in order to prevent any turning movement of the beams 36—36.

The centre plate 45 supports the car body 46 in any approved manner and the coordinating bolster 34 with reference to the car body 46 may swing angularly about said plate. Any approved form of side bearings such as 47, adapted to coact with wear plates 48 secured to the underside of the car body, may be interposed between said body and the coordinating bolster. Further, the central member 38 is provided with four gibs 49 true on the outer surface thereof, which project downwardly and each has a sliding bearing upon one of the true surfaces 33 of the frame 31, thus connecting the coordinating bolster and the central bolster together in such manner that while the former can have angular movement in a vertical plane and vertical and transverse movements with reference to the latter, yet the latter is forced to partake of the angular movement in a horizontal plane of the former.

Each of the bearings 35 of the coordinating bolster 34 may have longitudinal movements as well as angular movements within the corresponding rocker bearings 28.

In order to maintain the horizontal rigidity of the coordinating bolster and to secure its flexibility in vertical planes I preferably employ the triangulated trusses 50, as shown in Fig. 1. Said trusses are secured to the beams 36 in such a manner that the latter can have no relative horizontal, but are capable of relative vertical movement. One method of securing the trusses 50 is shown in Fig. 1, in which the ends of said trusses are pivotally mounted between ears 51 formed on the beams 36. The trusses 50 are arranged on either side of the member 38 so that the coordinating bolster 34 may be reversed in direction without affecting its mode of operation. Moreover, it will be noted that the trusses 50, in addition to serving as a means of articulating the longitudinal beams together, resist transverse forces operating upon said beams.

All of the parts hereinbefore referred to are fully illustrated, described and the novel combinations thereof claimed in Patent No. 1,568,058 noted above.

Saddles, such as 52—52, are mounted on the pedestals 29—29 above the journals of the central bolster and a suitable block 53, which serves as an additional side bearing, is secured in each of said saddles. The wearing surfaces of said blocks are arranged slightly below those of the side bearings 47, for a purpose hereinafter explained, and a wear plate 54, attached to the car body, is adapted to coact therewith.

The action of my improved truck is as follows:—

Present truck side bearings are spaced as shown at 47—47 in Fig. 3, safety considerations requiring their being placed between the wheel flanges. This construction results in a considerable overhang of the car body beyond the bearings 47. It is obvious, therefore, that as the car body rocks, due to roadbed irregularities, there will be a marked increase in the pressure exerted on the bearings 47, the load varying from light to heavy and frequently causing deflections in the car floor.

The blocks 53 are so positioned relative to the bearings 47 that they begin to function before a condition of overloading exists on said bearings. They, therefore, exert a snubbing action on the car body and, by retarding its oscillation, materially reduce the pressure that would otherwise be directed on the journals.

The position of the blocks 53 on the central bolster is of particular advantage in the type of truck shown in Fig. 1. The vertical load from the car body is applied to the coordinating bolster 34 upon the center plate 45 and this load is then distributed to the beams 36—36, thence through the friction reducing elements 37 to the bases 26; from the bases 26, portions of the load are delivered to the pilot and trailer wheels and the remainder is delivered to the central wheels through the ball and socket joints connecting the pilot and trailer bolsters to the central bolster, the various parts being so proportioned and located that the loads upon the wheels are approximately equal, when the wheels are upon a level track and the car body is symmetrical with respect to the truck.

If the sum of the reactions along the line 5—5 in Fig. 1 be considered, it is obvious that the same will be constant, whether the weight of the car body and its contents be considered alone, or in conjunction with the forces set up by the oscillation of the car body. Therefore, the load exerted on the wheels of the central bolster can never be greater than normal, because the proportion of said reactions carried by said bolster is delivered thereto midway between said wheels. Hence, there is a reserve capacity in the central axle for taking such overload as might be due to body oscillation and the blocks 53 have been placed accordingly.

It is to be remembered, however, that the blocks 53 contact only momentarily with the wear plates 54 during the oscillation of the car body and the latter, therefore, does not in any sense ride on said block for an appreciable length of time. Otherwise, the car body might interfere with the positioning of the central member by the coordinating bolster when the truck is entering a curve.

As the essential conception in my invention is the devising of means for retarding body oscillation, I consider that any means which may be utilized for this purpose, to be within the spirit of my invention and therefore do not desire to be limited to the exact location, or combinations, shown or described, for many changes, such as placing the side bearings 48 and blocks 53 on the car body, may be made therein.

I claim:—

1. The combination with a car body having a king pin and a plurality of wear plates disposed transversely under said body and on each side of said pin, of a car truck comprising wheels, axles for said wheels, journal boxes for said axles, a center plate for engagement with said pin, and a plurality of side bearings disposed transversely on each side of said center plate between said boxes and said wear plates, said bearings on each side of said center plate being adapted to contact successively with said wear plates when the car body rocks, thereby damping the oscillation of said body.

2. The combination with a car body having a king pin and a plurality of wear plates disposed transversely under said body and on each side of said pin, of a car truck comprising wheels, axles for said wheels, journal boxes for said axles, a center plate for engagement with said pin, and a plurality of side bearings disposed transversely on each side of said center plate between said boxes and said wear plates, the bearing surfaces of said side bearings, on each side of and outwardly from said center plate, being successively lower in elevation.

3. The combination with a car body having a plurality of wear plates transversely disposed thereunder on each side of the longitudinal axis thereof, of a six wheel truck having a bolster for each pair of journals, a coordinating bolster engaging with the central bolster and with each of the pilot and trailer bolsters to control the mutual angularity of said journals, and with the pilot and trailer bolsters to transmit the load stress thereto, a ball and socket joint between each of said pilot and trailer bolsters and said central bolster to transmit the load stress to said central bolster, said coordinating bolster having a side bearing on each side thereof and said central bolster having a bearing disposed on the pedestal thereof above each of the central journals, said bearings coacting with said wear plates to damp the oscillation of said body.

4. The combination with a car body having a plurality of wear plates transversely disposed thereunder on each side of the longitudinal axis thereof, of a six wheel truck having a bolster for each pair of journals, a coordinating bolster engaging with the central bolster and with each of the pilot and trailer bolsters to control the mutual angularity of said journals, and with the pilot and trailer bolsters to transmit the load stress thereto, a ball and socket joint between each of said pilot and trailer bolsters and said central bolster to transmit the load stress to said central bolster, said coordinating bolster having a side bearing on each side thereof and said central bolster having a bearing disposed on the pedestal thereof above each of the central journals, the bearing surface of each central bolster bearing being lower in elevation than each coordinating bolster bearing.

5. The combination with a car body having a plurality of wear plates transversely disposed thereunder on each side of the longitudinal axis thereof, of a six wheel truck having a bolster for each pair of journals, a coordinating bolster engaging with the central bolster and with each of the pilot and trailer bolsters to control the mutual angularity of said journals, and with the pilot and trailer bolsters to transmit the load stress thereto, a ball and socket joint between each of said pilot and trailer bolsters and said central bolster to transmit the load stress to said central bolster, said coordinating bolster having a side bearing on each side thereof and said central bolster having a bearing disposed on the pedestal thereof above each of the central journals and aligned with said coordinating bolster bearings for coacting with said wear plates to damp the oscillation of said body.

6. In a six wheel truck, the combination with three interconnected and relatively movable journal bolsters, of means for supporting a car body on the truck including a coordinating bolster having bearings on the two outer journal bolsters, side bearings for the car body on said coordinating bolster, and supplemental side bearings on the central journal bolster.

7. In a six wheel coordinating truck, the combination with three journal bolsters two of which are adapted to be supported in part on opposite sides of the third, a ball and socket joint connecting the two outer bolsters with the central bolster, means for supporting a car body upon the truck including a coordinating bolster engaging the central journal bolster and resting on the outer bolsters, side bearings for the car body on said coordinating bolster, and supplemental side bearings on the central journal bolster.

8. In a six wheel coordinating truck, the combination with three interconnected and relatively movable journal bolsters, two of said bolsters being adapted for partial support on opposite sides of the third, means for supporting a car body upon the truck including a coordinating bolster engaging the central journal bolster and resting on the outer bolsters, side bearings on said coordinating bolster for supporting the body when the latter is unbalanced laterally, and means for transferring a part of the thrust of the unbalanced body to the central journal bolster at points apart from the longitudinal center line of the truck.

9. In a six wheel truck, the combination with three interconnected and relatively movable journal bolsters, of means for supporting a car body on the truck including a coordinating bolster having bearings on the two outer journal bolsters, side bearings for the car body on said coordinating bolster, and supplemental side bearings on the central journal bolster, said side bearings on each side of the longitudinal axis of said truck being arranged to contact successively with the underside of said body.

10. In a six wheel truck, the combination with three interconnected and relatively movable journal bolsters, of means for supporting a car body on the truck including a coordinating bolster having bearings on the two outer journal bolsters, side bearings for the car body on said coordinating bolster, and supplemental side bearings on the central journal bolster, said supplemental bearings being lower in elevation than said first named side bearings.

11. In a six wheel truck, the combination with three interconnected and relatively movable journal bolsters, of means for supporting a car body on the truck including a coordinating bolster having bearings on the two outer journal bolsters, side bearings for the car body on said coordinating bolster, and supplemental side bearings on the central journal bolster disposed on the pedestals thereof above each of the central journals.

In testimony whereof, I affix my signature.

CARL L. CHARLES.